US009720962B2

United States Patent
Allen et al.

(10) Patent No.: US 9,720,962 B2
(45) Date of Patent: Aug. 1, 2017

(54) ANSWERING SUPERLATIVE QUESTIONS WITH A QUESTION AND ANSWER SYSTEM

(71) Applicant: International Business Machines Corporation, Armonk, NY (US)

(72) Inventors: Corville O. Allen, Morrisville, NC (US); Albert A. Chung, Cary, NC (US); Roberto DeLima, Apex, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 14/463,154

(22) Filed: Aug. 19, 2014

(65) Prior Publication Data

US 2016/0055155 A1   Feb. 25, 2016

(51) Int. Cl.
*G06F 17/30* (2006.01)
(52) U.S. Cl.
CPC ...... *G06F 17/3043* (2013.01); *G06F 17/3053* (2013.01); *G06F 17/30657* (2013.01)
(58) Field of Classification Search
CPC .............................................. G06F 17/30657
USPC .................................................. 707/723, 749
See application file for complete search history.

(56) References Cited

U.S. PATENT DOCUMENTS

| 6,584,470 B2 | 6/2003 | Veale |
| 2005/0256700 A1 | 11/2005 | Moldovan et al. |
| 2007/0136246 A1 | 6/2007 | Stenchikova et al. |
| 2009/0287678 A1 | 11/2009 | Brown et al. |
| 2011/0066587 A1 | 3/2011 | Ferrucci et al. |
| 2011/0125734 A1 | 5/2011 | Duboue et al. |
| 2011/0320187 A1 | 12/2011 | Motik et al. |
| 2012/0131016 A1 | 5/2012 | Brown et al. |
| 2012/0189988 A1 | 7/2012 | Brown et al. |
| 2012/0253793 A1 | 10/2012 | Ghannam et al. |
| 2013/0007033 A1 | 1/2013 | Brown et al. |
| 2013/0007055 A1 | 1/2013 | Brown et al. |
| 2013/0018652 A1 | 1/2013 | Ferrucci et al. |
| 2013/0018875 A1* | 1/2013 | Qiao ................ G06F 17/30657 707/723 |
| 2013/0066886 A1 | 3/2013 | Bagchi et al. |

(Continued)

OTHER PUBLICATIONS

Allen et. al., "Producing Insight Information From Tables Using Natural Language Processing", Filing Date Apr. 25, 2014; U.S. Appl. No. 14/262,288.

(Continued)

*Primary Examiner* — Chelcie Daye
(74) *Attorney, Agent, or Firm* — Stephen J. Walder, Jr.; Diana R. Gerhardt

(57) ABSTRACT

Mechanisms are provided for generating an answer to a superlative question. The mechanisms analyze the superlative question to extract a superlative term in the superlative question and a focus. A metric by which to evaluate the superlative term is identified based on one of a clue term in the superlative question or one or more portions of content of a corpus of information including the superlative term and focus. A search of the corpus is executed to identify one or more candidate answers to the superlative question based on evidence passages in the corpus, the superlative term, the focus, and the metric. A final answer to the superlative question is output based on the one or more candidate answers.

18 Claims, 5 Drawing Sheets

(56) References Cited

U.S. PATENT DOCUMENTS

| | | | |
|---|---|---|---|
| 2013/0262501 A1* | 10/2013 | Kochmann-Beauger | G06F 17/30958 707/769 |
| 2013/0304730 A1 | 11/2013 | Zhou | |
| 2014/0046934 A1* | 2/2014 | Zhou | G06F 17/30864 707/723 |
| 2014/0072948 A1 | 3/2014 | Boguraev et al. | |
| 2014/0122535 A1 | 5/2014 | Gerard et al. | |

OTHER PUBLICATIONS

Byron et. al., "Adapting Tabular Data for Narration", Filing Date Mar. 15, 2013; U.S. Appl. No. 13/838,130.

Byron et. al., "Discovering Title Information for Structured Data in a Document", Filing Date Feb. 27, 2013; U.S. Appl. No. 13/778,901.

Byron, et al., "Discovering Relationships in Tabular Data", filed Jul. 1, 2013, U.S. Appl. No. 13/932,435.

Byron, et al., "Discovering Relationships in Tabular Data", filed Nov. 26, 2013, U.S. Appl. No. 14/090,184.

Byron, et al., "Subject-Matter Analysis of Tabular Data", filed Jul. 18, 2013, U.S. Appl. No. 13/945,259.

Byron, et al., "Subject-Matter Analysis of Tabular Data", filed Nov. 26, 2013, U.S. Appl. No. 14/090,230.

Gerard, et. al., "Extracting Semantic Relationships from Table Structures in Electronic Documents", Filing Date Oct. 30, 2012; U.S. Appl. No. 13/664,144.

Asaduzzaman, Muhammad et al., "Answering Questions about Unanswered Questions of Stack Overflow", IEEE, May 2013, pp. 97-100.

Cao, Jinwei et al., "Automated Question Answering from Lecture Videos: NLP vs. Pattern Matching", Proceedings of the 38th Hawaii International Conference on System Sciences, IEEE, Jan. 3-6, 2005, pp. 1-8.

High, Rob, "The Era of Cognitive Systems: An Inside Look at IBM Watson and How it Works", IBM Corporation, Redbooks, Dec. 12, 2012, 16 pages.

Leonhard, Annette, "Towards Retrieving Relevant Information for Answering Clinical Comparison Questions", Proceedings of the Workshop on BioNLP, Jun. 2009, pp. 153-161.

Yuan, Michael J., "Watson and healthcare, How natural language processing and semantic search could revolutionize clinical decision support", IBM developerWorks, IBM Corporation, Apr. 12, 2011, 14 pages.

* cited by examiner

| 410 | |
|---|---|
| CITY | POPULATION |
| NEW YORK | 14 MILLION |
| MEXICO CITY | 12 MILLION |
| LOS ANGELES | 5 MILLION |

| 420 | |
|---|---|
| CITY | AREA (SQ. MILES) |
| NEW YORK | 300 |
| MEXICO CITY | 800 |
| LOS ANGELES | 400 |

NEW YORK IS THE LARGEST CITY WITH A POPULATION OF 14 MILLION.

MEXICO CITY IS THE SECOND LARGEST CITY WITH A POPULATION OF 12 MILLION.

LOS ANGELES IS THE THIRD LARGEST CITY WITH A POPULATION OF 5 MILLION.

NEW YORK IS THE THIRD LARGEST CITY WITH A SIZE OF 300 SQUARE MILES.

MEXICO CITY IS THE LARGEST CITY WITH A SIZE OF 800 SQUARE MILES.

LOS ANGELES IS THE SECOND LARGEST CITY WITH A SIZE OF 400 SQUARE MILES.

*FIG. 4*

ANSWERING SUPERLATIVE QUESTIONS WITH A QUESTION AND ANSWER SYSTEM

BACKGROUND

The present application relates generally to an improved data processing apparatus and method and more specifically to mechanisms for answering superlative questions with a question and answer system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a question and answer (QA) system comprising a processor and a memory, for generating an answer to a superlative question is provided. The method comprises analyzing, by the QA system, the superlative question to extract a superlative term in the superlative question and a focus of the superlative question. The method further comprises identifying, by the QA system, a metric by which to evaluate the superlative term based on one of a clue term in the superlative question or one or more portions of content of a corpus of information comprising the superlative term and focus. In addition, the method comprises executing, by the QA system, a search of the corpus to identify one or more candidate answers to the superlative question based on evidence passages in the corpus, the superlative term, the focus, and the metric. Moreover, the method comprises outputting, by the QA system, a final answer to the superlative question based on the one or more candidate answers.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example of the conversion of tables in a corpus into natural language statements in accordance with one illustrative embodiment.

DETAILED DESCRIPTION

Figure 1:
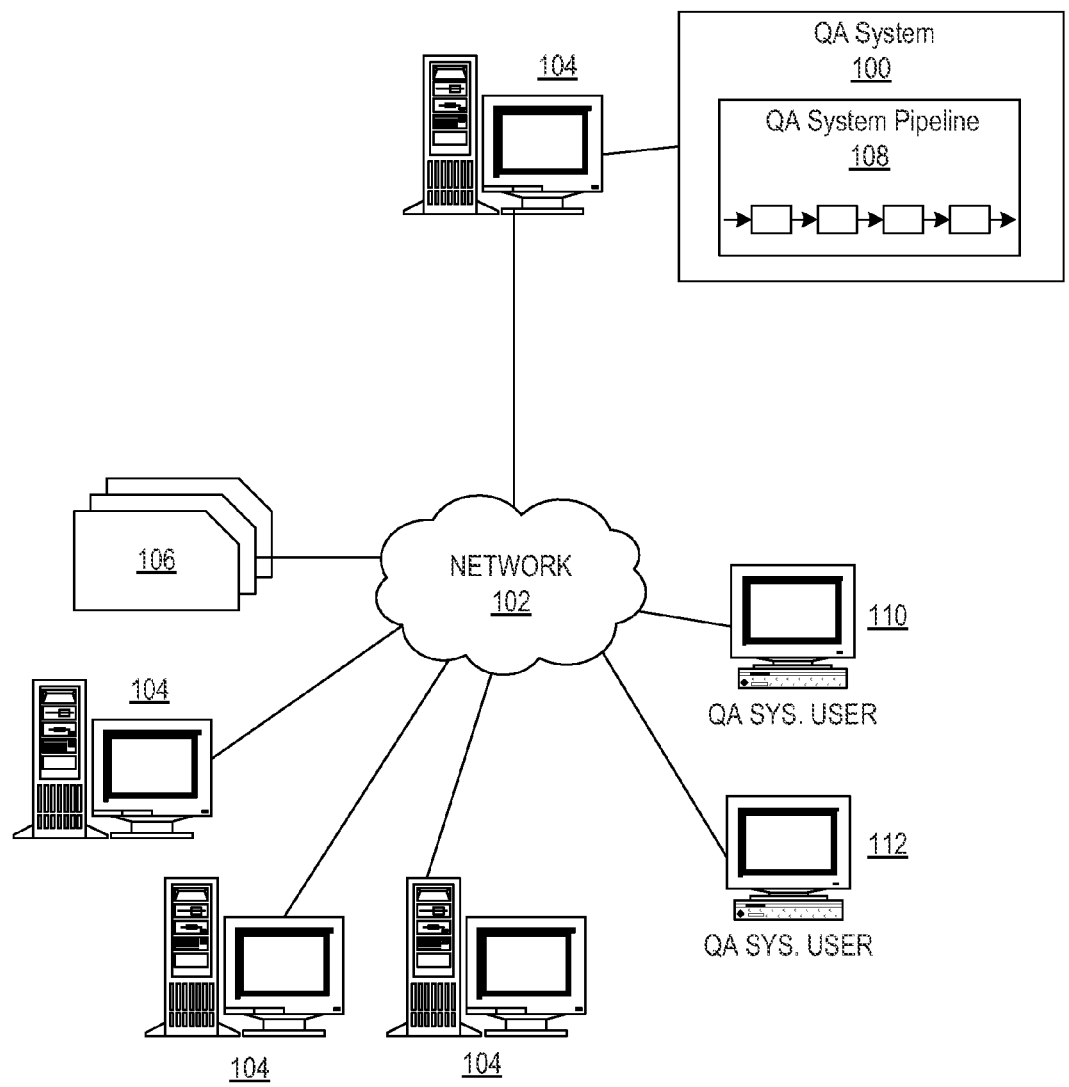
FIG. 1 depicts a schematic diagram of one illustrative embodiment of a question/answer creation (QA) system in a computer network.

The illustrative embodiments provide mechanisms for answering superlative questions with a question and answer system. A superlative question is a question that requires an evaluation of relative quality or quantity, e.g., "best", "highest," "greatest", "largest", etc. These questions tend to rank one potential answer against others using a qualitative or quantitative measure. For example, a superlative question may be of the type "What is the largest city in the United States?"

Question and Answer (QA) systems often have difficulty in generating correct answers to such questions when the corpus, i.e. collection of documents, webpages, blogs, website posts, or other information content, upon which the QA system operates does not have direct support in the documentation of the corpus for a particular answer to the question. For example, if the question "What is the largest city in the United States?" is posed to a QA system, the QA system may have difficulty answering this question if there is no document in the corpus that explicitly states "the largest city in the United States is New York", for example.

In the absence of explicit statements in documents of the corpus that match the input question, a more advanced analysis would be necessary to determine the relative rankings of cities with regard to a particular metric. However, many times, it is not clear from the question itself what metric is to be used to evaluate the superlative terms in the question. That is, in the above example question, how does one measure "largest"? The term "largest" can refer to a largest geographical area, a largest population, or the like. Thus, the metric for evaluating the superlative term "largest" is not clear from the text of the question itself. As a result, the QA system may have difficulty in generating a correct answer to the question, e.g., the QA system may return an answer based on population when the user was interested in obtaining an answer based on geographical area.

The illustrative embodiments address the issues of ambiguous superlative questions by providing mechanisms that determine the most likely basis upon which to evaluate the superlative terms of the question. The illustrative embodiments determine the most likely basis or metric for evaluating superlative terms by evaluating various factors of the input question and information obtained from the corpus that are indicative of the metric to use to evaluate the superlative terms. In one illustrative embodiment, the determination of the basis or metric is based on clue terms provided in the input question itself. In another illustrative embodiment, the determination of the basis or metric to use is based on searches of the corpus to identify the most often used metrics for evaluating the superlative term in association with the identified focus of the question. The corpus is then evaluated based on the identified metric to extract information indicative of a relative ranking of candidate answers that match the focus of the input question, e.g., if the focus is a city name, then corresponding metric information associated with candidate answers corresponding to different cities, e.g., Chicago, New York, etc., are evaluated. The ranking of the candidate answers is then used as a basis for selecting an answer to the input question matching the requested information, e.g., if the question is "What is the largest city in the United States?" then, based on a ranking of the cities found in the corpus according to their population metric, which is determined to be the most likely metric to be used to answer the question, New York is listed highest relative to other United States cities whose population information was provided in the corpus, and may be selected as a final answer to this particular question. The search of the corpus to identify a basis or metric to use to evaluate a superlative term may be combined with the use of clue terms in the input question to provide a hybrid approach to determining the best basis or metric to use to evaluate the particular superlative term in the input question.

In one illustrative embodiment, mechanisms are provided for first determining whether an input question has a superlative term in the input question and if so, whether the superlative term has any associated modifiers, e.g., "second" largest, "third most" populated, etc. This determination may be made by using logic that recognizes different superlative terms using a dictionary of such superlative terms, or other natural language processing that looks at the characteristics of the terms, e.g., terms ending in the character string "est" may be considered superlative terms.

The input question is further evaluated to determine a focus of the input question, i.e. the portion of the question where, if that portion is replaced by the answer, the question becomes a standalone statement, e.g., a name of a person, an occupation, a book title, a date, a time, a city, etc., and retrieve attributes of the focus, e.g., if the focus is a city, then attributes of a city include a land area, a population, geographical coordinates, mayor, average weather conditions, etc. The identification of the focus may be performed in a manner generally known in the art of natural language processing and question analysis by QA systems. For example, the IBM Watson™ QA system provides mechanisms for analyzing input questions and extracting features from the input question including the focus of the question, lexical answer type (LAT) of the question, keywords of the question, and the like.

The mechanisms of the illustrative embodiments then determine the most appropriate ranking metric for answering the input question. This determination may involve evaluating the input question itself to determine if the input question provides a clue as to the metric to be utilized, such as a term indicative of the metric to use to evaluate the superlative term (referred to herein as a "clue term"). For example, the input questions "What is the largest city in the United States by population?" and "What is the most populous city in the United States?" clearly indicate that the metric to use is population when evaluating the superlative term "largest." If such clue terms are present in the input question, then the metric corresponding to the clue term is utilized to evaluate the superlative terms of the input question.

Alternatively, if the input question does not include such clue terms, the most often used ranking metric in the corpus of information upon which the QA system operates is used as a basis for evaluating the superlative terms. In order to identify what the most often used ranking metric is in the corpus, a search of the corpus is performed based on the superlative term and the question focus. Portions of the documents in the corpus that contain the superlative term and the question focus are searched to identify the nearest focus attribute that indicates a ranking metric. For example, the sentence "New York is the largest city in the world with 14,000,000 inhabitants" has both the superlative term "largest" and the focus of a city name, i.e. "New York", and has the term "inhabitants" which is a synonym for, or related term to, the attribute "population," as may be identified from data structures specifying synonyms or related terms. This is a suggestion that the metric to use to evaluate the term "largest" is to rank cities by population.

A count of the number of occurrences of the different types of attributes (and thus, corresponding metrics) identified in the corpus in this manner may be generated to determine which attribute/metric is most often utilized in the corpus to evaluate the superlative term. For example, the attribute "population", and thus population metrics, may be used with 100 instances of statements of the superlative term "largest" and a city name in the corpus while geographical land area metrics may be used with 50 instances of statements of the superlative term "largest" and a city name. In such a case, the population metric is determined to be the most often used metric in association with the superlative term and focus and is selected for use in answering the input question. This determination provides an indication of the information that most people use to represent or otherwise associate with the superlative term, e.g., when most people refer to the "largest" city, according to the corpus they mean the largest city by population.

Based on the identification of the most often used metric for evaluating the superlative term, the mechanisms of the illustrative embodiments then perform QA system processing on the input question and corpus in a known manner with the metric being used as an extracted feature of the input question and a basis by which to evaluate the passages of text, data, or other information content in the corpus to generate candidate answers to the input question. In this way, the most often used metric for evaluating the superlative term, which is otherwise not evident in the input question itself, may be used as a basis for evaluating the corpus and generate candidate answers.

In some illustrative embodiments, each metric or basis for evaluating the superlative question may be used to perform an evaluation of the input question and corpus to generate candidate answers. Separate sets of candidate answers may be generated for each of the different metrics or basis for evaluation of the superlative question. Final answers generated based on each of these separate metrics or basis may be presented to the user as separate alternative answers to the input question with the most often used metric being presented more prominently than answers generated for other metrics or basis. In fact, the various final answers for the various metrics or basis may be ranked according to the relative ranking of the metrics or basis relative to one another, e.g., if a most often used metric is population and a less often used metric is geographical area, then the final answer generated as a result of the evaluation based on the population metric may be ranked higher than the final answer generated as a result of the evaluation based on the geographical area metric.

Thus, with the mechanisms of the illustrative embodiments, ambiguously stated superlative questions may be evaluated with a higher likelihood of presenting an answer that corresponds to what the user submitting the input question intended. The mechanisms of the illustrative embodiment thus alleviate the difficulty of QA systems to answer such superlative questions and increase the accuracy of the operation of the QA system with regard to such questions.

Before beginning a more detailed discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
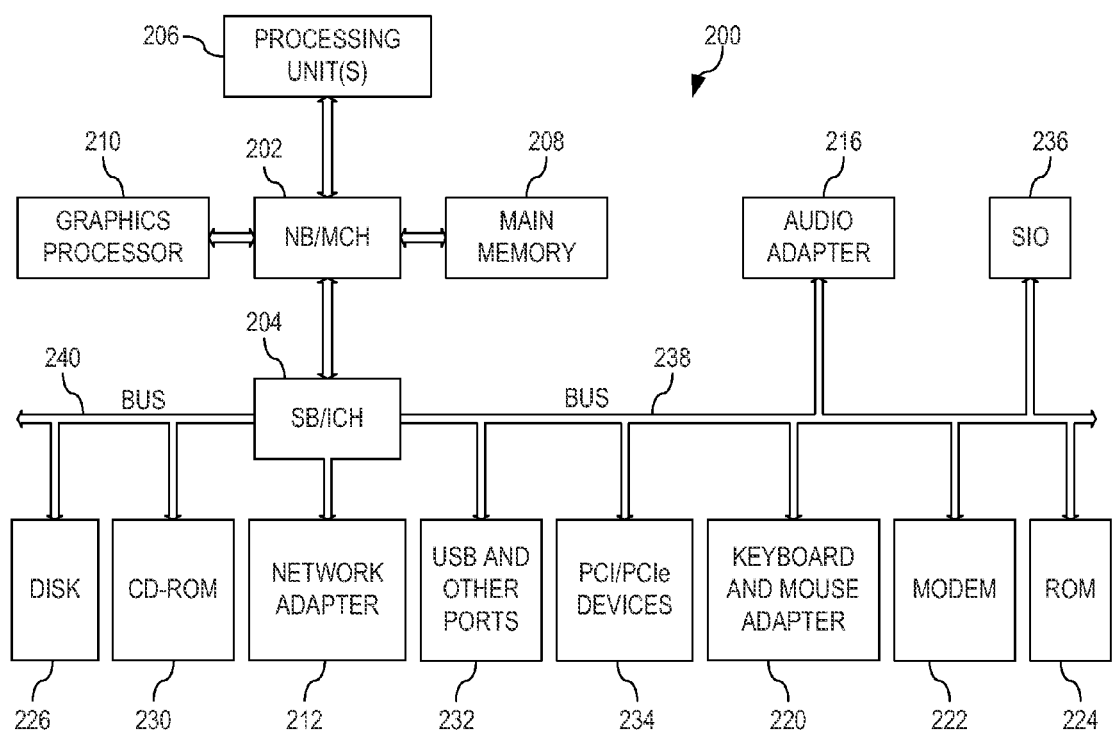
FIG. 2 is a block diagram of an example data processing system in which aspects of the illustrative embodiments may be implemented.
Figure 3:
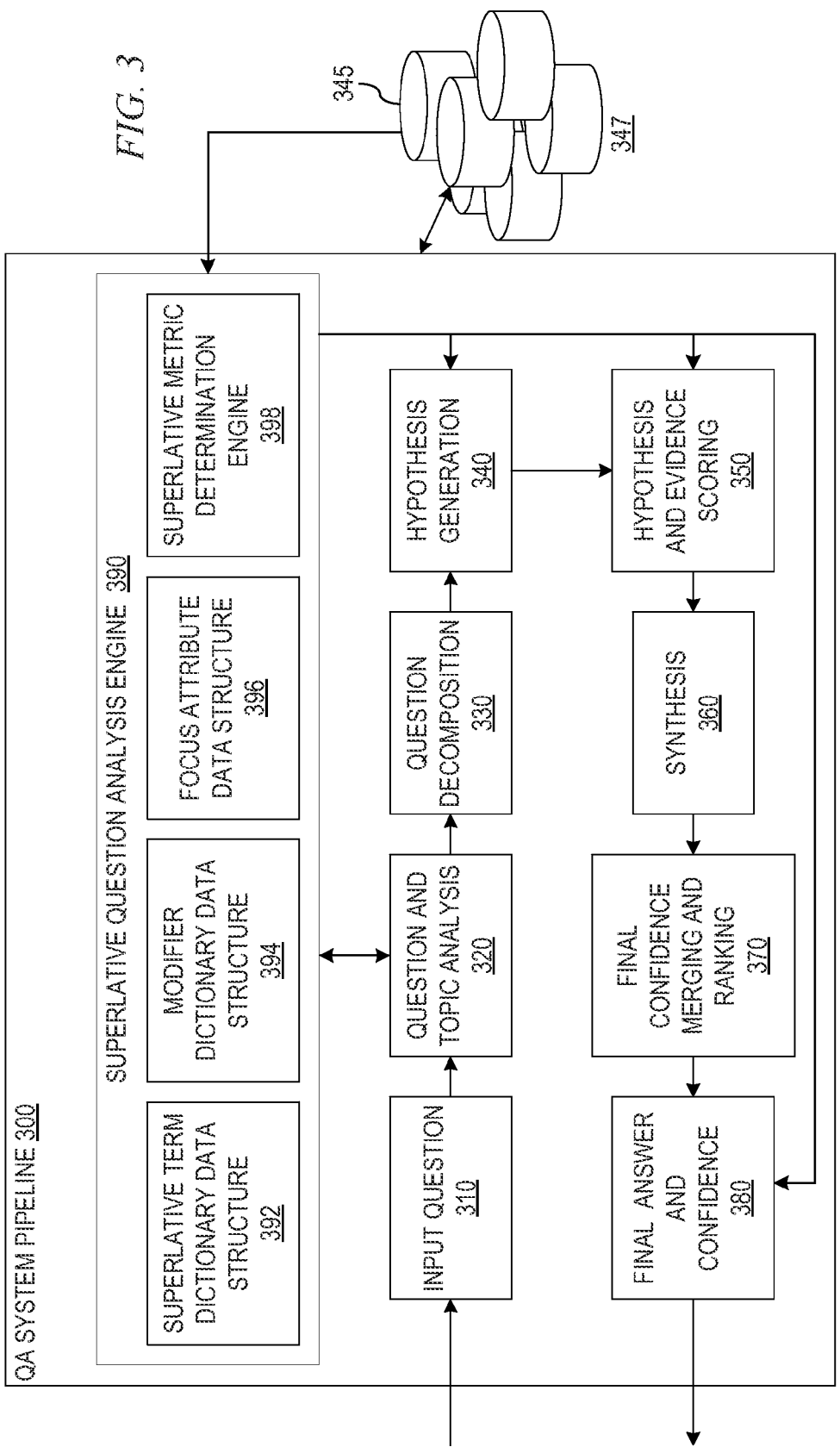
FIG. 3 illustrates a QA system pipeline for processing an input question in accordance with one illustrative embodiment.

It should be appreciated that the illustrative embodiments may be utilized in many different types of data processing environments that implement a Question and Answer (QA) system. FIGS. 1-3 are directed to describing an example QA system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to answering superlative questions, and especially superlative questions that are ambiguous with regard to the metric by which to evaluate the superlative criteria of the question.

Thus, in order to have a basis upon which to understand the improvements provided by the mechanisms of the illustrative embodiments, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a question and answer system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems.

The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

In accordance with the illustrative embodiments of the present invention, a superlative question analysis engine 390 is provided in the QA system pipeline 300. The superlative question analysis engine 390 evaluates the input question received in stage 310 with regard to superlative terminology used in the input question. The superlative question analysis engine 390 determines a metric or basis by which to evaluate the superlative aspects of the input question. In one illustrative embodiment, the superlative question analysis engine 390 utilizes a superlative term dictionary data structure 392 to identify superlative terms in input questions and thereby identify the input question as a superlative question requiring special handling by the QA system pipeline 300.

That is, during feature extraction as part of stage 320, key words are extracted and compared against the superlative terms identified in the superlative term dictionary data structure 392 and, if there is a match, it is determined that the input question is a superlative question requiring additional processing to evaluate the superlative aspects of the question. Thus, for example, in extracting key words from the input question, words or terms such as "biggest," "largest", "best", "second largest", "third most", and the like, may be extracted along with other terms and key features of the input question. These key words are compared against the superlative terms in the superlative term dictionary data structure 392 to determine if there are any matches between the extracted key words and the terms in the dictionary data structure 392, e.g., the extracted key word "biggest" from the input question also appears in the dictionary data structure 392 and thus, is a match. If there are any matches, then the question is determined to be a superlative question.

It should be appreciated that in some illustrative embodiments, rather than having to use key word matching with a dictionary data structure 392, or in addition to using a key word matching with a dictionary data structure 392, the illustrative embodiments may perform analysis of the key words to determine if they match a pattern indicative of a superlative form. For example, key words ending in the string "est" and modifying or operating on a focus of the question may be considered to be superlative terms, e.g., "What is the best restaurant?" has a focus of "restaurant" which is modified by the term "best" which ends in "est," or "Who is the oldest person in the world?" has a focus of "person" which is modified by the term "oldest" which also ends in the string "est." Similar other patterns may be defined as well to identify terms such as "most," and the like.

Having identified the question as a superlative question, the superlative question analysis engine 390 evaluates the extracted features of the input question to determine if there are any modifiers associated with the superlative term(s) in the input question. That is, natural language processing, or key word comparison to a modifier dictionary data structure 394, is performed on the extracted features to determine if any of the key words associated with the superlative term are modifiers, e.g., terms such as "second highest," "third most," etc. have modifiers of "second," "third," etc. The modifiers are used when evaluating the candidate answers to select the appropriate candidate answer from the ranked listing, e.g., rather than selecting the highest ranked candidate answer, the second highest ranked answer may be selected if the question calls for the "second" largest, or "second" highest, etc. Any such modifiers are stored for use by the QA system pipeline 300 when evaluating the candidate answers during the final answer generation stage 380, as described hereafter.

Referring again to stage 320, as part of the parsing of the input question and extraction of key features from the input question, the focus of the input question is identified. Again, the focus of the input question is the portion of the input question that identifies the type of answer that is sought such that if an answer of that type is used to replace the focus, the question becomes a statement, e.g., a person's name, a city name, a numerical value, a date, a time, a medical condition, stock name, or any of a plethora of other focus types. The focus essentially identifies what the user is looking for, e.g., the focus of the question "Who was the first President of the United States?" is the name of a person, and in particular a President, as can be deduced from the use of the terms "who" and "President". The focus may be specific to a particular domain, e.g., financial industry, medical industry, etc.

The superlative question analysis engine 390 receives the focus of the input question along with the other extracted features from the logic of stage 320 and performs a lookup operation in a focus attribute data structure 396 to identify the attributes associated with the focus. For example, if the focus is a city, then attributes associated with a city include a population, a land mass area, a mayor, an average income of the inhabitants, a geographical location of the city, etc. As another example, in the medical field, the attributes associated with a focus of "medical condition" may include symptoms, treatments, drug names, etc. Various attributes may be defined for each type of focus depending on the particular focus type and the domain. The attributes associated with the focus of a superlative question are returned to the superlative question analysis engine 390 which utilizes these attributes to evaluate passages of a corpus for purposes of identifying a metric by which to evaluate the superlative aspect of the input question, e.g., "largest," "biggest," "most," etc.

In determining the metric or basis by which to evaluate the superlative aspect of the input question, the superlative question analysis engine 390 first determines if the question itself contains any clue terms as to the identification of the metric to be used. Such clue terms may include terms or phrases, identified through natural language processing including parsing and syntactic analysis of the terms and phrases in the input question, that are adjectives, adverbs, prepositional phrases, or other terms/phrases that describe or modify the focus or superlative term. For example, the question "What is the largest city by population?" contains the phrase "by population" which modifies the superlative term "largest" and thus, is a clue term as to the metric to be utilized when evaluating the superlative term. As another example, the question "What is the most populous city?" contains the term "populous" which modifies the focus "city" and thus, is a clue as to the metric to use to evaluate the superlative "most".

One way in which the mechanisms of the illustrative embodiments may identify such clue terms is to have a list data structure that lists the clue terms that are recognized. This list data structure may be populated by human subject matter experts and/or automated machine learning processes. With an automated machine learning process, a corpus may be evaluating during ingestion to identify superlative terms and corresponding clue terms associated with those superlative terms. The correspondence between superlative and clue term may be used to generate entries into the list data structure that correlate superlative terms with clue terms, or simply list the clue terms as terms that can be looked for in question parsing.

As another example, through the learning of the most frequently, or most popular, basis for evaluating superlative terms in accordance with the mechanisms of the illustrative embodiments as described herein, the terms, modifiers, and superlatives associated with such terms/modifiers corresponding to these bases may be identified and used to populate the list data structure. This information may be combined with occurrence or frequency information to generate a tuple entry into a data structure that can be used not only for the identification of clue terms, but for the identification of most frequently used basis for evaluating superlative terms, in some illustrative embodiments.

For example, a tuple may be defined in a list data structure that is of the type <object>-<modifier term>-<occurrence>. As a more concrete example, tuples of the type <city>-<population>-<2500> and <city>-<size>-<1800> indicate that for the object "city," the clue term "population" has a number of occurrences equal to 2500 while the clue term "size" has a number of occurrences of 1800. Thus, in parsing the input question and identifying clue terms, both "population" and "size" will be identified if they exist in the input question. In addition, it can be determined from the number of occurrences that "population" is the most often used metric by which to evaluate a superlative term in the input question.

In another algorithmic approach, the parsing of the input question may include identifying the prepositional phrase in the input question, if any, and finding the noun/subject of the preposition. The preposition is then searched in the list data structure to determine if the preposition is present with a high enough frequency, as compared to a predetermined threshold indicative of a reasonably high use of the preposition with regard to superlative term evaluation, to warrant its use as a clue term for the evaluation of the superlative term in the input question. For example, a high enough frequency for a preposition may be set to at least 5% of the time the noun is mentioned in the corpus with the preposition included in the same sentence parse.

If it is determined that the input question itself contains clue terms that are clues as to the metric to use to evaluate the superlative aspects of the input question, using one or more of the mechanisms described above, or other mechanisms that will become apparent to those of ordinary skill in the art in view of the present description, then those clue terms are used to identify the metric to be used. For example, in the case of the clue terms "by population" or "populous" in the examples above, a metric of population is used to evaluate the superlative aspect of the questions with regard to identify the largest city or most populous city. Synonym or related term evaluations similar to that described above may be used to correlate clue terms in the input question to particular metrics, e.g., a data structure may correlate terms such as "population," "populous," "inhabitants," "citizens," "people," etc. with the metric "population." The identified metric is then added to the extracted features of the input question for use in evaluating the corpus and identifying candidate answers to the input question.

As noted above, in some cases, it is not clear from the input question itself what metric is to be used to evaluate the superlative aspects of the input question. That is, the input question does not include any clue terms indicative of the metric or basis by which to evaluate the superlative terms in the input question. For example, the question "What is the largest city?" does not provide any indication as to how to evaluate the superlative term "largest" and there may be many different bases and metrics by which to determine which city is "largest," e.g., population, land mass area, etc. If the wrong metric or basis is selected, the user will be presented with an incorrect answer for the user's intended request. That is, the user may have intended to ask "What is the largest city by geographical area?" but because the user presents the input question as "What is the largest city?" the user may be given an answer as a result that is based on a population metric, e.g., the answer "New York" may be returned because it has the largest population. However, if a metric of land area is used instead, the answer "Mexico City" would have been returned since it has a larger land mass area than New York. Thus, the user is presented with an incorrect answer since the user was unclear in the basis for evaluating the superlative term in the question.

In order to reduce the likelihood of the wrong basis or metric being used to evaluate superlative terms and superlative aspects of an input question when the input question is ambiguous as to the basis or metric to be used, the illustrative embodiments provide mechanisms in the superlative question analysis engine 390 for determining the most likely basis or metric to use in evaluating the superlative terms/aspects of the input question. That is, the superlative metric determination engine 398 is provided which evaluates the corpus 347 to determine what is the most frequently used metric or basis for evaluating the superlative term in association with the focus of the input question. In particular, the superlative metric determination engine 398 searches the content in the corpus 347 using the superlative term and the focus of the input question to find evidence passages within the content that contain both the superlative term and the focus. For example, in the input question "What is the largest city?," the superlative term is "largest" and the focus is "city," such that the content of the corpus 347 is searched to find instances in the content where both the terms "largest" and "city" are present in content within a predetermined window or range of one another, e.g., where the range or window may be measured in a number of words, number of sentences, paragraph, a section of a document, an entire document, or the like. In most cases, the corpus 347 is searched to identify instances where the superlative term and the focus appear in the same sentence in an evidence passage of the corpus 347.

For those portions of the content of the corpus 347 that contain both the superlative term and the focus, e.g., the sentence or evidence passage having both search elements, the portion of content is then searched to find the nearest attribute of the focus that indicates a possible metric for evaluating the superlative term. That is, the attributes that are retrieved for the identified focus are used as a basis for matching against terms or phrases in the portion of content having the superlative term and focus. As with the other evaluations previously described, synonyms may likewise be considered when identifying the existence of such attributes in the portions of content.

For example, using the input question example previously discussed above, i.e. the input question "What is the largest city?", the superlative term is "largest" and the focus is "city" with the attributes of the focus being determined from the lookup operation performed in the focus attribute data structure 396, e.g., attributes of population, land mass or geographic area, mayor, etc. Synonyms to these attributes may include, for example, population: inhabitants, citizens, and people; geographic area: size, city limit, square miles, etc., as determined from a synonym data structure. The listing of focus attributes is used as a mechanism to match terms in the portion of content by determining if the attribute terms themselves, or synonyms to the attribute terms, appear in the portion of content near the superlative term and focus.

For example, consider a portion of content that comprises the evidence passage "New York is the largest city in the world with 14,000,000 inhabitants." The superlative term "largest" appears in this evidence passage along with the focus of "New York." Thus, this evidence passage would be identified by the superlative metric determination engine

398 as a potential source for identifying a metric by which to evaluate the superlative term of the input question. As a result, the superlative metric determination engine 398 further evaluates the identified evidence passage to determine the nearest focus attribute, if any, in the evidence passage, to the superlative term and focus. In this example case, the nearest focus attribute is "inhabitants" which, according to the focus attribute data structure 396, is correlated with a population metric. Thus, it is determined from this evidence passage that the metric to be used to evaluate the superlative term "largest" in association with the focus of a "city" is a population metric.

It should be appreciated that this process may be repeated for multiple different portions of content and evidence passages of the corpus 347, and different portions of content and evidence passages will generate different indications of metrics to be used to evaluate the superlative term. A count of each of these instances may be maintained to identify which metric is used most often in the corpus 347. For example, there may be 100 evidence passages identified that reference a population metric with regard to the superlative term and focus while only 50 evidence passages reference a geographical area metric with regard to the superlative term and focus. In such a case, the population metric, having a higher occurrence in the corpus 347, is determined to be the most popular or most likely basis for evaluating the superlative term and is selected by the superlative metric determination engine 398 as the basis by which to evaluate the superlative term in the input question.

The identified most likely metric or basis for evaluating the superlative term of the input question is added to the set of extracted features of the input question for further consideration when performing processing of the input question and corpus by the QA system pipeline 300 in the manner previously described above. As a result, for example, the QA system pipeline 300, operating on the question "What is the largest city?" utilizes queries of terms such as largest, and city, and population (as identified as the most likely metric by which to evaluate the superlative term), and their synonyms when searching the corpus 347 to identify candidate answers to the input question. Hence, evidence passages that contain information about the populations of cities in the corpus 347 are evaluated to identify evidence passages that indicate the population metrics of these various cities for evaluation.

The QA system pipeline 300, and in particular the hypothesis and evidence scoring stage 350, scores the evidence passages and hypotheses (candidate answers) according to the degree of matching of the terms in the queries as well as the relative ranking of the metric for evaluating the superlative term taking into consideration any modifies of the superlative term. Thus, for example, if the input question is of the type "What is the second most populous city?", rather than merely weighing the candidate answer corresponding to a city with the highest population with the highest weighting, since the input question is looking for the "second most" populous city, evidence passages indicating the "second most" populous city may be weighted or scored more highly than evidence passages identifying the "most" populous city. Alternatively, the evidence passages may be weighted according to relative ranking such that the most populous city candidate answer is scored or weighted highest, the second most populous city is weighted or scored the second highest, and so on such that a ranked listing of candidate answers is generated based on the relative metric values. Then, the modifier may be taken into consideration when selecting the final answer from the ranked listing, e.g., if the second most populous city is desired as an answer, then rather than selecting the top ranked candidate answer, e.g., New York at a population of 14 million, the second ranked candidate answer, e.g., Mexico City at a population of 12 million, may be selected as the final answer to the input question.

The final answer, as mentioned above, may be output to the submitter of the original input question via a graphical user interface or other interface for outputting information. The final answer by itself may be output or the final answer may be output along with a listing of a predetermined number of other candidate answers in the ranked listing of candidate answers such that the user that submitted the input question is informed of the other possible candidate answers considered by the QA system pipeline 300. These candidate answers, and/or the final answer, may be output in a ranked listing and may have associated with them confidence measures, evidence passages, and the like that provide the user with information as to the basis for the selection of the candidate answers and their relative ranking. In addition, an indication of the metric used to evaluate the superlative term may be included in the results returned to the user. Thus, for example, in response to the input question "What is the largest city?" a response may be generated by the QA system pipeline 300 that "The largest city by population is New York with a population of 14 million."

It should be appreciated that while the above illustrative embodiments utilize a single metric to evaluate the superlative term to provide a final answer, in other illustrative embodiments, each possible metric for evaluating the superlative term may be separately used as a basis for evaluating the superlative term and superlative aspects of the input question and thereby generate separate sets of candidate answers. Thus, for example, if one metric for evaluating the "largest" city is population, and a second metric for evaluating the "largest" city is geographical area, then both of these metrics may be separately provided as extracted features of the input question for processing by the QA system pipeline 300 or separate QA system pipelines 300 operating in parallel. The result is two separate sets of candidate answers and/or final answers which may be presented to the user as alternatives for answering the input question. For example, a user output may specify both "The largest city by population is New York with a population of 14 million." And "The largest city by geographic area is Mexico City at 800 square miles." Hence, multiple answers, or sets of candidate answers, to the input question may be generated with each answer, or set of candidate answers, being associated with a different metric for evaluating the superlative term of the input question. In this way, the user may select which answer, or set of answers, matches the intent of the user when submitting the input question, e.g., the user intended to ask for the largest city by population and thus, selects the answer/set of answers corresponding to the metric of population.

Thus, the illustrative embodiments provide mechanisms for processing superlative questions via a QA system that minimizes incorrect answers by determining the most likely metric by which to evaluate the superlative terms and aspects of the input questions. In the case of ambiguous superlative questions, the metrics are determined based on a frequency of use of the metric within the corpus that is processed by the QA system. This is an indication of the most popular basis by which to evaluate the superlative aspects of the input question and thus, is most likely to result in the correct answer for the intent of the user that submitted the input question. In other illustrative embodiments, multiple metrics may be evaluated and the results presented to the user as alternatives from which the user may select the answer that best meets with the intent of the user.

It should be appreciated that while the above illustrative embodiments are described in terms of the corpus comprising portions of content or evidence passages that contain natural language statements that include the values or criteria by which to evaluate the metrics, the corpus 347 may not include such natural language statements. For example, the corpus 347 may in fact include the evidence information specifying the metric for evaluating the superlative term in a table format or other data format within documents or separate files. An example of tables that may be present in the corpus 347 in this way is shown in FIG. 4.

As shown in FIG. 4, a first table 410 comprises a listing of city names and the corresponding populations. A second table 420 comprises a listing of city names and geographical area in square miles. Depending on which table is used, different answers to the question "What is the largest city?" may be returned, e.g., if table 410 is used as a basis, then the answer "New York" is returned as the largest city by population whereas if the table 420 is used as a basis, the answer "Mexico City" is returned as the largest city by geographical area.

It should be appreciated that natural language processing systems, such as a QA system, have difficulty in evaluating table data structures. Thus, the table data structure, in order to be utilized with the QA system, is converted, by table conversion mechanisms during an ingestion process operating on the corpus, into natural language statements that reflect the information presented in the table data structures 410 and 420. Examples of the natural language statements generated from the table are shown in FIG. 4, e.g., "New York is the largest city with a population of 14 million." Similar statements may be generated for other types of superlative terms, such as "smallest." One table conversion mechanism that may be used to generate such natural language statements from table data structures is described in co-pending and commonly assigned U.S. patent application Ser. No. 14/262,288 entitled "Producing Insight Information from Tables Using Natural Language Processing," filed on Apr. 25, 2014, which is hereby incorporated by reference. The natural language statements generated from the table data structure may be stored in association with the table data structure in the corpus 347 and may be used as a basis for evaluation of the superlative terms of input questions in the manner previously described above.

Figure 5:
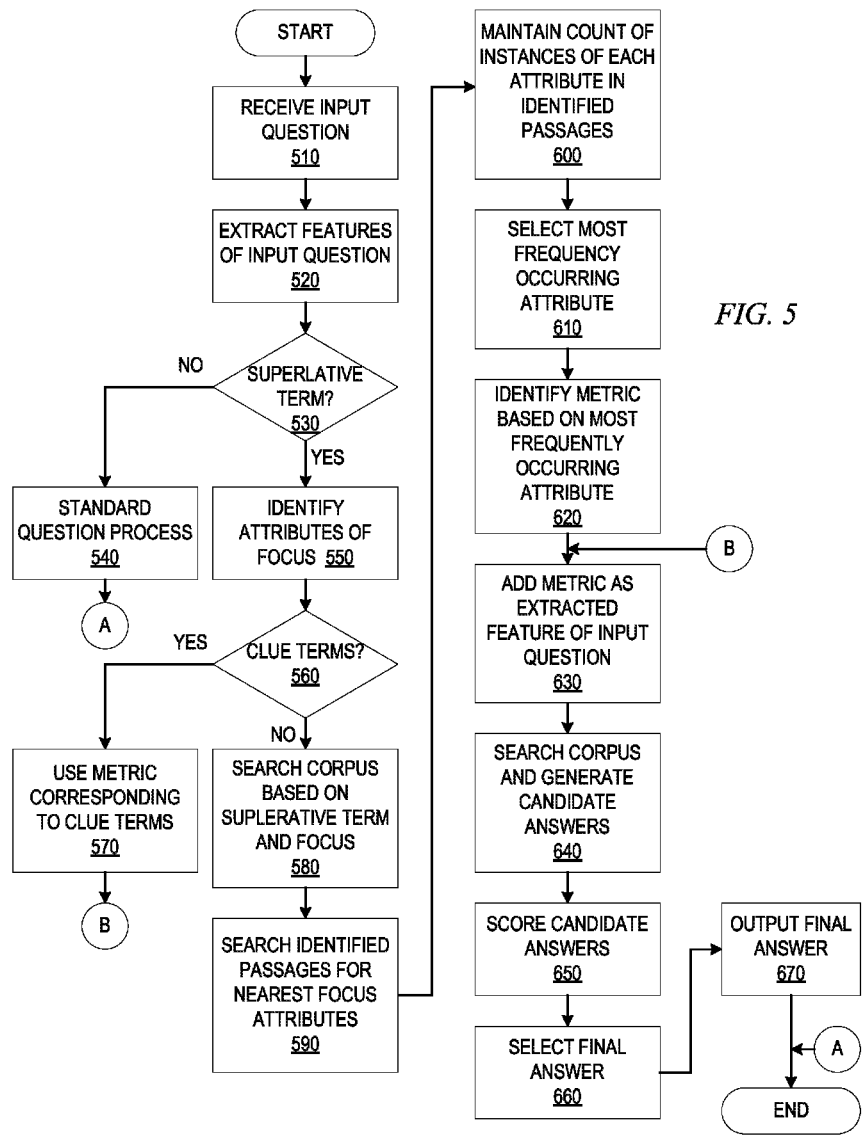
FIG. 5 is a flowchart outlining an example operation of a QA system implementing a superlative question analysis engine in accordance with one illustrative embodiment.

FIG. 5 is a flowchart outlining an example operation of a superlative question analysis engine of a QA system in accordance with one illustrative embodiment. As shown in FIG. 5, the operation starts with the QA system receiving an input question (step 510). For example, a user may log onto the QA system and use a graphical user interface to input a textual question for which the user wishes to obtain an answer. In one illustrative embodiment in accordance with the mechanisms for superlative question analysis, the input question contains a superlative term, such as "biggest," "largest," "longest," "oldest," "most," or the like. The superlative term may further have an associated modifier, such as "second," "third," or the like.

It should be appreciated that these are only examples of superlative terms and modifiers, and other terms of a superlative nature, or modifiers of superlative terms, may also be identified and evaluated using the mechanisms of the illustrative embodiments. For example, other modifier terms may include, in a software product development domain, version identifiers, such as "Alpha", "Beta", "latest", "service release", and the like. As an example, an input question may be of the type "What is the least stable version of the XYZ video game?" with the modifier being "least" in the input question but with the modifiers associated with used to represent versions of the XYZ video game, or software in general, being "Alpha", "Beta", "Gold", "Final", "Release" and then version numbers. Hence, statements in the corpora for video games may be of the type "There are many stability problems, in the alpha, of the game XYZ" or "The beta of XYZ is very stable."

Returning to FIG. 5, the QA system parses and analyzes the input question to extract features of the input question including key words and/or phrases, a lexical answer type (LAT), a focus, and the like (step 520). The extracted features of the input question are input to the superlative question analysis engine which determines whether there are any superlative terms in the input question through a lookup operation in a superlative term data structure (step 530). If there are no superlative terms in the input question, the QA system processes the input question in a standard manner without having to perform specialized processing based on superlative term analysis (step 540). Otherwise, if there is one or more superlative terms in the input question, the superlative question analysis engine identifies the question as a superlative question and identifies the attributes associated with a focus of the superlative question (step 550).

The extracted features of the input question are analyzed to determine if there are any clue terms in the extracted features as to the metric or basis by which to evaluate the superlative terms of the superlative question (step 560). If there are such clue terms present, then the clue terms are used to identify a metric or basis by which to evaluate the superlative term in the input question (step 570). If there are no such clue terms present, a search of the corpus is performed to identify passages comprising instances of a combination of the superlative term and the focus of the input question (step 580). The identified passages are searched to identify a nearest attribute of the focus of the input question (as identified in step 550 above) in the passages, if any (step 590). Counts of the various attributes are maintained and updated according to the identification of these instance of the attributes in close proximity to the combination of the superlative term and focus within the passages (step 600). Based on the counts, a most frequently used attribute is selected as an attribute corresponding to a metric for evaluating the superlative term (step 610).

The superlative question analysis engine identifies the metric associated with the attribute based on a synonym data structure (step 620) and the metric is added as an extracted feature of the input question for use by the QA system when processing the input question and corpus (step 630). The QA system then searches the corpus, based on the input question's extracted features, including the identified metric for evaluating the superlative term, and generates candidate answers (step 640). The QA system scores the candidate answers, taking into consideration any modifiers of the superlative term to modify the scoring (step 650). The QA system selects a final answer to the input question based on the scoring of the candidate answers (step 660) and outputs the final answer to the submitter of the original input question (step 670). The operation then terminates.

Thus, again, the mechanisms of the illustrative embodiments provide functionality for identifying metrics to be used to evaluate superlative terms in questions, even in the case where the input question is ambiguous as to the metric to be used. The illustrative embodiments utilize information in the corpus to identify the most popular or frequently used metric for evaluating the superlative terms in the context of the focus of the input question. As a result, a more accurate operation of the QA system implementing the mechanisms of the illustrative embodiment is achieved.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a question and answer (QA) system comprising a processor and a memory, for generating an answer to a superlative question, the method comprising:
    analyzing, by the QA system, the superlative question to extract a superlative term in the superlative question and a focus of the superlative question;
    identifying, by the QA system, a metric by which to evaluate the superlative term based on one of a clue term in the superlative question or one or more portions of content of a corpus of information comprising the superlative term and focus;
    executing, by the QA system, a search of the corpus to identify one or more candidate answers to the superlative question based on evidence passages in the corpus, the superlative term, the focus, and the metric; and
    outputting, by the QA system, a final answer to the superlative question based on the one or more candidate answers, wherein identifying the metric comprises identifying a plurality of metrics, and wherein executing a search of the corpus to identify one or more candidate answers to the superlative question based on evidence passages in the corpus, the superlative term, the focus, and the metric comprises performing a separate search for each metric in the plurality of metrics and generating a separate set of one or more candidate answers for each metric in the plurality of metrics.

2. The method of claim 1, further comprising:
    retrieving one or more attributes associated with the focus from an attribute data structure, wherein identifying the metric is performed based on the retrieved one or more attributes.

3. The method of claim 2, wherein identifying the metric based on the retrieved one or more attributes comprises identifying the metric based on one or more portions of content of the corpus of information comprising the superlative term and focus, and wherein identifying the metric further comprises, for each portion of content of the one or more portions of content comprising the superlative term and focus:
    determining an attribute of the one or more attributes that is in close proximity to the portion of content;
    selecting an attribute that is closest in proximity to the portion of content; and
    incrementing a counter value associated with the selected attribute in response to the selection of the attribute.

4. The method of claim 3, wherein identifying the metric further comprises:
    selecting an attribute whose corresponding counter value is largest, relative to counter values of other attributes in the one or more attributes; and
    identifying the metric based on the selected attribute.

5. The method of claim 1, wherein identifying the metric comprises identifying the metric based on a clue term in the superlative question at least by performing a lookup operation in a list data structure based on terms in the superlative question to identify the clue term as being present in the superlative question, wherein the list data structure stores a listing of clue terms recognizable by the QA system.

6. The method of claim 1, wherein outputting the final answer to the superlative question based on the one or more candidate answers comprises outputting a final answer for each metric in the plurality of metrics as alternative answers to the superlative question.

7. The method of claim 1, wherein outputting the final answer to the superlative question comprises ranking candidate answers from the separate sets of one or more candidate answers for each metric in the plurality of metrics relative to one another and selecting a final answer based on results of the ranking.

8. The method of claim 7, wherein the ranking is performed based on a relative rank of the metrics in the plurality of metrics.

9. The method of claim 1, wherein analyzing the superlative question to extract a superlative term in the superlative question and a focus of the superlative question comprises identifying superlative terms based on at least one of a matching of extracted keywords in the superlative question to a superlative term dictionary data structure or performing a string pattern matching operation on the extracted keywords.

10. A computer program product comprising a computer readable storage medium having a computer readable program stored therein, wherein the computer readable program, when executed on a question and answer (QA) system comprising a processor and a memory, causes the QA system to:
- analyze a superlative question to extract a superlative term in the superlative question and a focus of the superlative question;
- identify a metric by which to evaluate the superlative term based on one of a clue term in the superlative question or one or more portions of content of a corpus of information comprising the superlative term and focus;
- execute a search of the corpus to identify one or more candidate answers to the superlative question based on evidence passages in the corpus, the superlative term, the focus, and the metric; and
- output a final answer to the superlative question based on the one or more candidate answers, wherein the computer readable program further causes the QA system to identify the metric at least by identifying a plurality of metrics, and wherein the computer readable programmer causes QA system to execute a search of the corpus to identify one or more candidate answers to the superlative question based on evidence passages in the corpus, the superlative term, the focus, and the metric at least by performing a separate search for each metric in the plurality of metrics and generating a separate set of one or more candidate answers for each metric in the plurality of metrics.

11. The computer program product of claim 10, wherein the computer readable program further causes the QA system to:
- retrieve one or more attributes associated with the focus from an attribute data structure, wherein identifying the metric is performed based on the retrieved one or more attributes.

12. The computer program product of claim 11, wherein the computer readable program further causes the QA system to identify the metric based on the retrieved one or more attributes at least by identifying the metric based on one or more portions of content of the corpus of information comprising the superlative term and focus, and wherein identifying the metric further comprises, for each portion of content of the one or more portions of content comprising the superlative term and focus:
- determining an attribute of the one or more attributes that is in close proximity to the portion of content;
- selecting an attribute that is closest in proximity to the portion of content; and
- incrementing a counter value associated with the selected attribute in response to the selection of the attribute.

13. The computer program product of claim 12, wherein the computer readable program further causes the QA system to identify the metric at least by:
- selecting an attribute whose corresponding counter value is largest, relative to counter values of other attributes in the one or more attributes; and
- identifying the metric based on the selected attribute.

14. The computer program product of claim 10, wherein the computer readable program further causes the QA system to identify the metric at least by identifying the metric based on a clue term in the superlative question at least by performing a lookup operation in a list data structure based on terms in the superlative question to identify the clue term as being present in the superlative question, wherein the list data structure stores a listing of clue terms recognizable by the QA system.

15. The computer program product of claim 10, wherein the computer readable program further causes the QA system to output the final answer to the superlative question based on the one or more candidate answers at least by outputting a final answer for each metric in the plurality of metrics as alternative answers to the superlative question.

16. The computer program product of claim 10, wherein the computer readable program further causes the QA system to output the final answer to the superlative question at least by ranking candidate answers from the separate sets of one or more candidate answers for each metric in the plurality of metrics relative to one another and selecting a final answer based on results of the ranking.

17. The computer program product of claim 16, wherein the ranking is performed based on a relative rank of the metrics in the plurality of metrics.

18. An apparatus comprising:
- a processor; and
- a memory coupled to the processor, wherein the memory comprises instructions which, when executed by the processor, cause the processor to:
- analyze a superlative question to extract a superlative term in the superlative question and a focus of the superlative question;
- identify a metric by which to evaluate the superlative term based on one of a clue term in the superlative question or one or more portions of content of a corpus of information comprising the superlative term and focus;
- execute a search of the corpus to identify one or more candidate answers to the superlative question based on evidence passages in the corpus, the superlative term, the focus, and the metric; and
- output a final answer to the superlative question based on the one or more candidate answers, wherein the instructions further cause the processor to identify the metric at least by identifying a plurality of metrics, and wherein the instructions further cause the processor to execute a search of the corpus to identify one or more candidate answers to the superlative question based on evidence passages in the corpus, the superlative term, the focus, and the metric at least by performing a separate search for each metric in the plurality of metrics and generating a separate set of one or more candidate answers for each metric in the plurality of metrics.

* * * * *